United States Patent
Toh et al.

(10) Patent No.: US 9,619,451 B2
(45) Date of Patent: Apr. 11, 2017

(54) SYSTEM AND METHOD FOR TRANSFERRING ANNOTATED VERSIONS OF E-BOOKS

(71) Applicant: Rakuten Kobo Inc., Toronto (CA)

(72) Inventors: Tai Toh, Toronto (CA); Pamela Hilborn, Toronto (CA)

(73) Assignee: Rakuten Kobo Inc., Toronto (CA)

( * ) Notice: Subject to any disclaimer, the term of this patent is extended or adjusted under 35 U.S.C. 154(b) by 78 days.

(21) Appl. No.: 14/039,487

(22) Filed: Sep. 27, 2013

(65) Prior Publication Data

US 2015/0007013 A1    Jan. 1, 2015

Related U.S. Application Data

(63) Continuation-in-part of application No. 13/930,651, filed on Jun. 28, 2013, now Pat. No. 9,454,756.

(51) Int. Cl.

| G06F 17/24 | (2006.01) |
| G06Q 20/12 | (2012.01) |
| G06F 21/10 | (2013.01) |
| H04L 29/06 | (2006.01) |

(52) U.S. Cl.
CPC .......... *G06F 17/241* (2013.01); *G06F 21/105* (2013.01); *G06Q 20/1235* (2013.01); *H04L 63/168* (2013.01); *G06F 2221/2117* (2013.01); *H04L 2463/101* (2013.01)

(58) Field of Classification Search
CPC .. G06F 3/04883; G06F 17/241; G06F 21/105; G06F 21/10
USPC .......................................................... 715/863
See application file for complete search history.

(56) References Cited

U.S. PATENT DOCUMENTS

| 8,364,595 B1 | 1/2013 | Ringewald |
| 8,398,483 B1 | 3/2013 | Brook et al. |
| 8,498,939 B1 | 7/2013 | Gupta |
| 2004/0230891 A1* | 11/2004 | Pravetz ................ H04L 9/3247 715/229 |
| 2005/0262081 A1* | 11/2005 | Newman ........... G06F 17/30994 |
| 2006/0116942 A1 | 6/2006 | Woyke |
| 2008/0168073 A1* | 7/2008 | Siegel ................ G06F 17/3002 |
| 2009/0234893 A1* | 9/2009 | Wakabayashi .... G06F 17/30905 |
| 2012/0254304 A1* | 10/2012 | Anbalagan ......... G06Q 30/0241 709/204 |
| 2013/0031643 A1 | 1/2013 | Rogel et al. |
| 2013/0047221 A1* | 2/2013 | Warnock et al. ................. 726/4 |
| 2013/0060661 A1 | 3/2013 | Block et al. |

* cited by examiner

*Primary Examiner* — Matt Kim
*Assistant Examiner* — David Luu
(74) *Attorney, Agent, or Firm* — Oblon, McClelland, Maier & Neustadt, L.L.P.

(57) ABSTRACT

Examples described herein provide a system and method for enabling users to annotate e-books and to transfer annotated e-books.

23 Claims, 5 Drawing Sheets

SYSTEM AND METHOD FOR TRANSFERRING ANNOTATED VERSIONS OF E-BOOKS

RELATED APPLICATIONS

This application is a continuation-in-part of U.S. patent application Ser. No. 13/930,651, filed on Jun. 28, 2013; the aforementioned priority application being hereby incorporated by reference in its entirety.

TECHNICAL FIELD

Examples described herein relate to a system and method for transferring annotated versions of e-books.

BACKGROUND

Digital content has become pervasive, in that consumers can now purchase various types of digital content items from numerous network or online sources. The distribution of digital content often includes programmatic controls to preclude users from distributing the content themselves.

DETAILED DESCRIPTION

Figure 1:
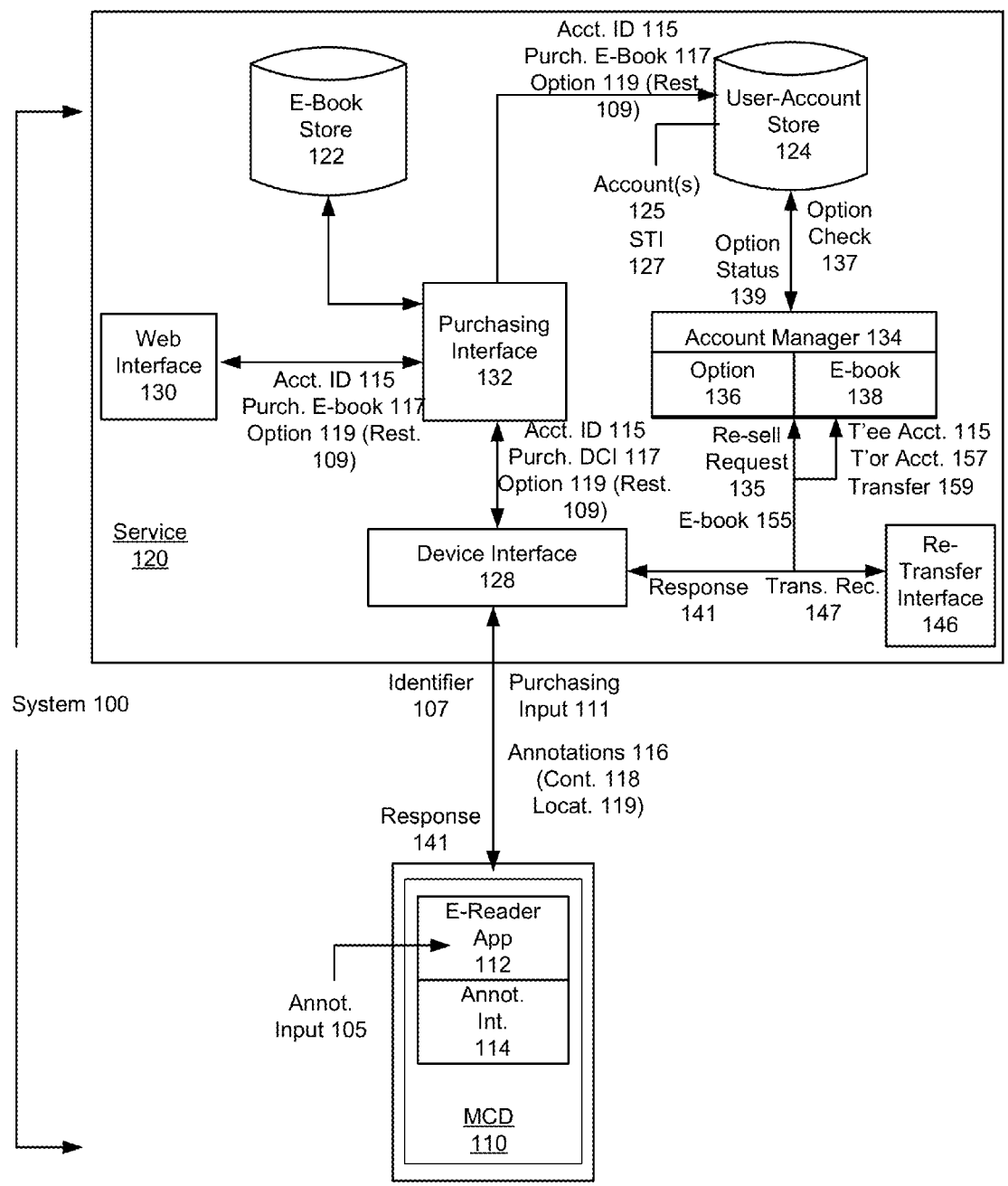
FIG. 1 illustrates a system for enabling resale of digital content items such as e-books, according to an embodiment.

Examples described herein provide a system and method for enabling users to annotate e-books, and further to transfer annotated e-books.

In an embodiment, a request to transfer an e-book is received for a user. A set of annotations that are associated with the e-book are identified. The set of annotations can be created on, for example, a device of the user. A recipient of the transfer is determined, and the e-book is provided to the recipient with the set of annotations.

In another embodiment, a request to transfer an annotated e-book is received from a user. A set of annotations are determined for the e-book. The set of annotations can be created on, for example, a device of the user. The e-book may be provided for download with the set of annotations to a population of users. The annotated version of the e-book can be provided as an updated version of the e-book.

Examples described herein include a programmatic mechanism for authorizing a user to re-transfer a digital content item (e.g., e-book). According to examples provided herein, the programmatic mechanism includes a data item, corresponding to an option, that can be used to authorize the user to re-transfer a purchased digital content item at a later date. With respect to examples described herein, digital content items can include, for example, media files for songs, television shows, movies, e-books, and digital comic books. While numerous embodiments described herein make reference to e-books, it should be appreciated that e-books are just one example of a digital content item for use with examples as described, and embodiments described herein are applicable to digital content items other than e-books, such as songs (or albums), videos (e.g., movies, television shows, video clips, music videos, etc.), or other works that can be embodied in a digital medium and subject to copyright laws.

"E-books" are a form of an electronic publication that can be viewed on computing devices with suitable functionality. Mufti-function devices, such as cellular-telephony or messaging devices, can utilize specialized applications (E.g., e-reader apps) to view e-books. Still further, some devices (sometimes labeled as "e-readers") can be centric towards content viewing, and e-book viewing in particular.

Generally, digital content items that are communicated as files amongst computers in network environments require numerous digital rights management safeguards that are designed to preclude unauthorized replication and distribution. Thus, consumers typically do not have the ability to re-sell or transfer purchases of digital content items. Among other benefits, examples described herein provide consumers with an option that enables them to re-sell or transfer (e.g., gift) a digital content item that they have purchased.

Examples described herein include a computing system or environment that enables the user to acquire an option to re-transfer a purchased digital content item at a later date. Data corresponding to the option can be recorded and linked with the user. Subsequent requests from the user to re-transfer the digital content item can be permitted or denied based on whether the user is authorized by way of having acquired the corresponding option.

According to some examples, a response to a user request to transfer a digital content item includes determining, from data stored in association with the user account, if the user elected to have a corresponding option to authorize the re-transfer for that particular digital content item. Based at least in part on whether the data indicates that the user elected to have such an option, the transfer of the right of possession of the digital content item is implemented. The transfer includes disassociating the digital content item from the user's account and associating the digital content item with an account of the second user.

In another example, a user can operate a device to communicate with a network service in order to purchase a right to transfer digital content items. For one or more digital content items that the user purchases, the user is offered an option to transfer right of possession to the digital content item. The right of transfer can be effective at a time that is subsequent to when the digital content item is purchased. The device is provided an interface in which the user can select individual digital content items from the user's collection for re-transfer (e.g., re-sell or gift). In response to the user attempting to select one of the digital content items for transfer, a programmatic determination is made as to whether the user has the right to transfer that item (based on the user having previously acquired the option). The user can transfer the digital content item in response to the determination that the user acquired the right to re-transfer the particular digital content item.

As used herein, a transfer in the right of possession is intended to mean that the right of a given user to enjoy or otherwise consume a digital content item is transferable. A transfer in the right of ownership to a particular digital content item can constitute a transfer in the right of possession. However, many examples described herein recognize that consumers do not often purchase true ownership to individual content items, as various digital rights management rules and laws preclude the user from truly owning a purchased copy of a digital content item. For simplicity, some examples may be described in the context of purchasing a digital content item (such as an e-book), and such example should be read in context in which what is actually purchased is a right of possession that permits the user to enjoy or otherwise consume (e.g. read, playback, etc.) a digital content item.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System and Device Description

FIG. 1 illustrates a system for enabling re-transfer of digital content items such as e-books, according to an embodiment. Furthermore, in some embodiments, FIG. 1 illustrates a system for enabling users to re-transfer annotated versions of an e-book.

In an example of FIG. 1, system 100 includes a mobile computing device 110 and a network service 120. The network service 120 may include multiple servers and other computing resources that provide various e-book services, including services in which e-books are sold, re-sold, shared, downloaded and/or stored. The mobile computing device 110 can correspond to any computing device on which an e-book can be rendered and consumed. For example, the mobile computing device 110 can correspond to a tablet, telephony/messaging device (e.g., smart phone) or portable computing device. The mobile computing device 110 can run an e-reader application 112 that links the device to the service 120 and enables e-books provided through the service to be viewed and consumed.

In some implementations, the mobile computing device 110 is equipped with hardware and software to optimize reading electronic content, including e-books. For example, the mobile computing device 110 can have a tablet like form factor, although variations are possible. In some cases, the mobile computing device 110 can also have an E-ink display.

The network service 120 can include a device interface 128, which communicates with individual devices that access the service. Among other resources, the network service 120 can include an e-book store 122 and a user account store 124. The user account store 124 can associate mobile computing device 110 with a user and an account 125. The account 125 can also be associated with one or more e-books, which can be stored in the e-book store 122. As described further, the user account store 124 can retain metadata for individual accounts 125 to identify e-books that have been purchased or made available for consumption for a given account. As described with many examples, the metadata can include supplemental transaction information 127, such as whether the user has purchased or otherwise acquired the right to re-transfer an e-book.

The mobile computing device 110 may be associated with the user account 125, and multiple devices may be associated with the same account. As described in greater detail below, the mobile computing device 110 can store e-books that are purchased or otherwise made available to the user of the mobile computing device 110. The mobile computing device 110 can also locally store other metadata and account information, such as meta-data that identifies which e-books the user has the option to re-transfer (e.g., re-sell e-book).

In some embodiments, the network service 120 communicates with an application or other functionality provided on the mobile computing device 110 in order to enable a user conduct purchasing activity for digital content items made available from or through the service 120. Specific examples of purchasing activity that can be enabled for mobile computing device 110 include the ability to purchase or otherwise download digital content item, such as e-books, as well as the ability to re-sell or transfer rights to such digital content items to other users. Still further, other types of activities that can be enabled for mobile computing device 110 include an ability to share an experience with the digital content item with other like-minded users.

According to some embodiments, network service 120 can include the web interface 130, a purchasing interface 132, and an account manager 134. The purchasing interface 132 can provide functionality to enable users to access and utilize the e-book store 122. The purchasing interface 132 can be provided as, for example, an online store which interfaces or otherwise uses the e-book store 122. The purchasing interface 132 enables a user to perform various kinds of purchasing activity, including activity to search for e-books, read reviews, make purchases for e-books, and purchase or otherwise acquire right to re-sell purchased e-book. For example, the user can purchase an e-book by making payment and then downloading a digital copy of the e-book to a device associated with the user's account. The purchasing interface 132 can include functionality for linking a user account so as to enable payment, as well as to link a purchase or otherwise downloaded digital content item with the user's account 125. In some examples, multiple devices may be associated with the user's account 125, and the purchased digital content item can be downloaded and/or made available to each device that is associated with the particular user account.

In implementation, mobile computing device 110 can be operated to communicate with device interface 128 to access the purchasing interface 132. For example, the user can operate the mobile computing device 110 to access the online bookstore for an e-reader, or alternatively, for a tablet on which an e-reader application is provided. In one implementation, the user can operate an application on the mobile computing device 110 which specifies an identifier 107 that can be used to determine a user's account. For example, the application running on the mobile computing device 110 can be associated with a login that is shared by the user's account, or alternatively the network service one 110 can use an identifier 107 transmitted by the mobile computing device 110 to link to the user's account (e.g., link to account identifier 115). In variations, the user can access the purchasing interface 132 (and the corresponding e-book library 122) through the web interface 130. For example, the user can access a website corresponding to network service 120, and then make a purchase of a particular digital content item using account identifier 115. Thus, according to various implementations, a user can perform different kinds of purchasing activity through, for example, either the mobile computing device 110 (e.g., application on the mobile computing device) or web browser (to access website).

In one example, a purchasing input 111 can be generated from the mobile computing device 110 in response to use input. On the network service 120, the purchasing input 111 can be communicated via the device interface 128 to the purchasing interface 132. The purchasing input 111 can be directed towards a purchasing activity, such as a search for an e-book, a request to purchase an e-book, a request to re-sell an e-book, and/or an input to purchase an option to re-sell an e-book. Alternatively, the purchasing input 111 can originate from a user accessing a corresponding website and using a web browser, and communicated to the network service 120 using a web interface 130 (e.g., web page). The purchasing input 111 can be linked to the account identifier 115 of the user, which can be associated with user information stored in the user account store 124. The user information can include transaction information such as the user's credit card account etc.

According to examples described herein, a user can access the network service 120 to (i) purchase an e-book (or other form of digital content item), (ii) acquire an option or right to re-sell an e-book, and/or (iii) acquire an option or right to transfer an annotated version of an e-book. The purchasing of the e-book can correspond to the user requiring a right of possession to read the e-book. In one embodiment, the option enables the user to transfer that right of possession a single time, to another user. In this respect, the acquired option enables the user to treat the e-book as a real book that can be resold as a used item. In one example, the purchasing input 111 can specify (or be correlated to) the account identifier 115 and a purchased e-book 117 (e.g., specific e-book that is being purchased). Additionally, in response to the user purchasing activity 111, the user can be prompted to elect to purchase an option 119 to re-sell the purchased e-book 117.

In some embodiments, the option 119 is provided to the user at a cost. For example, the option 119 can be offered to the user at a surcharge, above and beyond the cost for the purchased e-book. The cost for option 119 can be fixed (e.g., x dollars), or based on the price of the corresponding purchased e-book 117. In variations, some or all of the cost of the option 119 can be deferred. For example, the cost of the option 119 can be based on the price that the user is able to re-sell the corresponding e-book.

Still further, under variations, the option 119 is provided with a set of restrictions 109. The set of restrictions 109 can control facets as to how the option is used. In one implementation, the option 119 can restrict the user as to when the corresponding e-book can be transferred. For example, the user may be precluded from transferring the right of possession to the e-book under following examples: (i) until a certain time period has passed, or (ii) within a defined window of time.

The purchasing interface 132 can record the user's purchasing activity in connection with, for example, a purchased e-book 117. Thus, for example, when the user elects to purchase an e-book 117, the transaction can be recorded in the user account store 124 using the account identifier 115 and an identifier for the purchased e-book 117. Likewise, when the user elects to acquire the option 119, the purchasing interface 132 can record the option 119 in the user account store 124 as supplemental transaction information 127. In this way, the option 119 can be stored in association with the corresponding e-book 117. The user can also acquire the option 119 subject to one or more restrictions 109, as described above.

As described with various examples, the option 119 is usable by the user at a subsequent time, for purpose of enabling the user to re-sell a purchased e-book (or other digital content item). The resale of the purchased e-book can correspond to the user, transferring a right of possession to consume (e.g., read) an e-book. The account manager 134 can manage the user's rights with respect to re-selling e-books, or otherwise exercising options for re-selling e-books.

In one embodiment, a user can make a request 135 to re-sell a previously purchased e-book 155. For example, the user may make the request through an application running on the mobile computing device 110. The account manager 134 can include an option management process 136. In response to receiving the request 135, the option management process 136 checks to determine whether the user has acquired the option 119 for that e-book 155. In one implementation, the option manager 136 determines whether the option 119 exist for that user by checking the user's account information, maintained by the user account data store 124. The option management process 136 can determine option status 139 for the specified e-book using the account information.

Additionally, the option manager 136 can programmatically enforce restrictions 109 on the use of the option 119. The restrictions 109 can limit, for example, when the user can re-sell the corresponding e-book. For example, the restriction 109 may preclude the user from re-selling the e-book until a designated period of time has passed (e.g., time from purchase of corresponding e-book, set date, for a set duration from when the option is acquired etc.). As another example, the restriction 109 can set the number of times that the user can transfer the e-book (e.g., once or multiple times).

In response to an option check request, a response 141 may be communicated by the account manager 134 to the mobile computing device 110, via the device interface 128 (or alternatively, to the user via the web interface 130). The response 141 may correspond to an approval or denial of the re-sell request. For example, if the request is approved, a transaction record 147 can be generated for the particular e-book, based on user input, and the user can communicate the transaction record 147 to other individuals. In one implementation, the user may be provided access to re-sell interface 146 for a particular e-book. If the user has acquired the option to re-sell the e-book, the user may be enabled to communicate a transaction record 147 to the re-sell interface 146. The re-sell interface 146 can correspond to an online environment where used e-book transactions can take place. Alternatively, the transaction record 147 can be communicated through other communication mediums, such as to a specific user by way of electronic communication (e.g., e-mail, post the thread etc.).

In variations, restrictions 109 provided with the option 119 provide that the option is exercisable by the user for a given duration or window of time. A given duration of time can, for example, exclude a time after which the purchase has been made. For example, the user may be precluded from exercising the option for one week after making the purchase. Alternatively, the restriction 109 can designate the exclusion period based on a predetermined date specified from the publisher. For example, the publisher of the e-book may preclude re-selling e-books until a set time or date after which the e-book was initially released to the public (e.g., preclude bestsellers from being resold until one month after publication). Likewise, the restrictions 109 can provide for the option 119 to expire after a set time, such as a given duration after when the e-book is purchase. In variations, the value of the option (e.g., the amount of the user may have to pay to exercise the option) may be adjusted based on time relative to when the option was acquired, or when the e-book was purchased. Numerous such variations are possible.

Accordingly, once the option 119 for a particular e-book is exercised, the user has the ability to transfer the right of possession to the e-book. The account manager 134 can include processes (transfer manager 138) for implementing the transfer of rights to a particular e-book from one user to another. The user can, for example, offer the e-book for resale through an online medium such as the re-sell interface 146. As mentioned, the user can generate the transaction record 147, which can be stored with the user account, and/or communicated to persons or groups who may be interested in making the purchase. Still further, the user may simply communicate informally to friends and family regarding the availability of the e-book for transfer.

Once the option is exercised, the account manager 134 can receive or monitor for a transfer request 159 from the user who acquired the option 119 (i.e., the transferor of the e-book). Alternatively, the request to transfer may originate from a transferee who purchases the e-book, provided that the transferee can show proof of sale. In some implementations, the transfer request can identify the user account 115, the particular e-book 155 that is being resold, and the account 157 of the user who is acquiring the book. For example, the user acting as the transferor can make the request to transfer the particular e-book by specifying information, such as the identifier of the particular e-book, the transferor's user account 115, and the transferee user account 157. The check as to whether the user has the right to re-sell the particular e-book can be made when the transfer request is made, or before when the transfer request is made (e.g., as a separate request). Alternatively, the transferee can make a request by specifying the transferor's user account 115, the transferee user account 157, and the particular e-book that is the subject of the transaction, along with data that indicates proof of purchase.

The e-book manager 138 can implement the transfer of rights from the user that is the transferor to the user that is the transferee. Implementation of the transfer request 159 can include disassociating the particular e-book 155 from the transferor user account. The particular e-book can be disassociated or marked so that it is no longer available for download to the user from the network service 120. Additionally, the e-book manager 138 can direct, cause or otherwise confirm that local copies of the e-book 155 that is the subject of the transfer are deleted in whole (e.g., completely removed from memory) or in part (e.g., contents deleted, but metadata such as book cover can be maintained). As an alternative or variation, the network service 120 can disassociate the particular e-books by programmatically directing the mobile computing device 110 to electronically lock the local copy of the transferred e-book.

The e-book manager 138 may also perform steps to add or associate the subject e-book to the transferee account 157. For example, the transferee may have an existing account with the user account store 124, and the e-book manager 138 may associate data in the user account store 124 to enable the transferee user to download the e-book from the e-book store 122 (e.g., through the purchasing interface 132). Alternatively, the e-book manager 138 can implement, or communicate with other processes that implement issuance of a coupon or receipt for redemption of the e-book from an online bookstore.

In implementing the transfer, the account manager 134 can also perform steps for distributing funds in connection with the transfer. In one embodiment, the transfer request 159 (or follow on communication) specifies funds that are exchanged between the transferor and the transferee. Depending on implementation, the account manager 134 can distribute funds using a variety of formulas or distribution algorithms. In one implementation, the option 119 may be sold to the transferor at a charge, and the subsequent re-sell of the e-book results in all proceeds from the sale being distributed to the account of the transferor. In another implementation, the account manager 134 implements programmatic steps to retain some or all of the proceeds from the sale of the e-book 155. The retained proceeds can be distributed to, for example, the network service 120 as an administration charge and/or to a publisher of the e-book that was resold.

According to embodiments, the mobile computing device 110 includes an e-reader application 112 and an annotation interface 114. The annotation interface 114 can be provided as a component or feature of the e-reader application. For example, the annotation interface 114 can be provided as a plug-in or module for the e-reader application 112. As an alternative or variation, the annotation interface 114 can be provided as, or part of a stand-alone application, apart from the e-reader application 112. The e-reader application 112 can operate on the mobile computing device 110 to render an e-book. When operated, the e-reader application 112 can be responsive to user-input to enable e-reading functionality, such as page or chapter turning, menu selection, e-book selection, online browsing and purchasing etc. The annotation interface 114 can operate to enable the user to create annotations by interacting with input mechanisms of the mobile computing device 110. For example, the annotation interface 114 can process input by way of the user providing annotation input 105 via a keyboard or touch screen of the mobile computing device. As described below, the annotation input 105 can provide content, in the form of text, ink, image and/or audio. Furthermore, the annotation input 105 can provide location input as to a relative location where the annotation is to reside.

The mobile computing device 110 can store annotations 116 based on the annotation input 105. Furthermore, the mobile computing device 110 can communicate the annotations 116 to the network service 120. The annotations 116 can be communicated atomically (e.g., as one unit) with a corresponding e-book, or communicated independently but linked with a given e-book. In the latter case and as described below, the annotations 116 can be merged with an e-book at another location. The annotations 116 can correspond to data structures that include a content aspect 118 and a location aspect 121. The content aspect 118 corresponds to the content, such as the text or ink content the user provided. The location aspect 121 identifies the location of the annotation within the e-book. The location can be specific to the page, as well as to a spatial location of the page (e.g., margin or white space at particular distance from a given word or line). In addition to the content aspect and location aspect, annotations can include text or other identifiers that are indicative of an individual who created the annotations. By way of example, the annotations can include initials or screen names of annotators, or alternatively names (e.g., author name if author is annotator).

In one implementation, the annotations 116 can be affixed to a local copy of the e-book on which the annotation is made. For example, the annotation 116 can be linked to a corresponding e-book by metadata. Additionally, the annotation 116 can be affixed to an online copy of the e-book when the e-book is purchased. For example, the annotation 116 can be transferred to the network service 120 without a corresponding copy of the e-book. Still further, the annotation 116 can be affixed to a single copy of the e-book. Thus, for example, the annotation 116 can be affixed to a local copy of the e-book when the e-book is local. The user can subsequently transfer the e-book to another location, in which case the annotation 116 is transferred to the network service 120, then replicated on another version of the e-book. When a transfer of the annotated e-book occurs, the annotations 116 can be transferred independent of the e-book that received the input. The annotation 116 can subsequently be merged or otherwise combined with an online copy of the e-book. In variations, an actual copy of the e-book with annotations is communicated from the mobile computing device to the network service 120. As a result of the transfer, the mobile computing device 110 deletes or disassociates with the e-book with the annotated comments.

In some variations, the ability of the user to create annotations, or create annotations that are permanent to a particular copy (e.g., device copy or account copy) can be an acquired right, such as provided by an acquired option. As an addition or alternative, the ability of the user to transfer (e.g., gift) an annotated e-book can also be an acquired option. In implementation, the annotations can be made permanent on the mobile computing device 110 of the user, or permanently affixed by the network service 120, such as at the time the user uploads the e-book or transfers the e-book to another user. Additionally, depending on implementation, absent the acquired right, the user may be precluded from making the transfer, or may be limited to transferring the e-book without the annotations.

A system such as described by FIG. 1 provides for annotation interface 114 to receive annotation input. In response, the annotation interface 114 can enable the creation of annotations for a given e-book. Moreover, in some implementations, the annotation 116 is permanently affixed to a copy of the e-book. As described by some example, the e-book can be transferable by a user, so that the user can transfer an annotated version of the e-book. A permanently annotated copy of the e-book can, for example, be personalized and unique.

According to some examples, the user can transfer a personalized e-book or digital content item. For example, the user can transfer (e.g., gift) an annotated version of an e-book. In one embodiment, a user can download an e-book, personalize it with annotations, then transfer it to another user. The re-transfer can be a sale, loan or gift. In variations, the re-transfer of annotated version of an e-book can be subject to certain conditions such as whether the user has separately purchased an option or right to re-transfer an annotated version of the e-book. Additionally, the e-book store 122 can include publisher rules that restrict the right to annotate an e-book and/or to transfer an e-book. For example, the ability to annotate an e-book may be granted only to a special class of users (e.g., the author, purchaser of first edition), or subject to a condition. As an example, annotations may be permitted only for recipients of first transfers (when the user purchases or receives the e-book directly from the network service 120 rather than another user), but not to recipients of a re-transfer. In some variations, multiple re-transfers of a single e-book are permitted, and multiple users can include annotations, so that a cumulative and annotated version of an e-book is transferred from one user to another.

In some embodiments, the annotations 116 that the user creates can be locked or made permanent to the copy of the e-book. The user can then re-transfer the copy with the permanent annotations to another user. As another variation, a copy with annotations can be copied or re-published as a new version. For example, the user of the mobile computing device 110 can correspond to a user who has the right to annotate and re-publish (e.g., author of the e-book). The user can create the annotated version via the annotation interface 114, then upload the annotated copy to the network service 120 as a new version of the e-book. The copy of the e-book with the annotations 116 can be stored with the e-book store 122 and made available for browsing or searching. Other users of the network service 120 can download the version of the e-book with the annotations 116.

Figure 2:
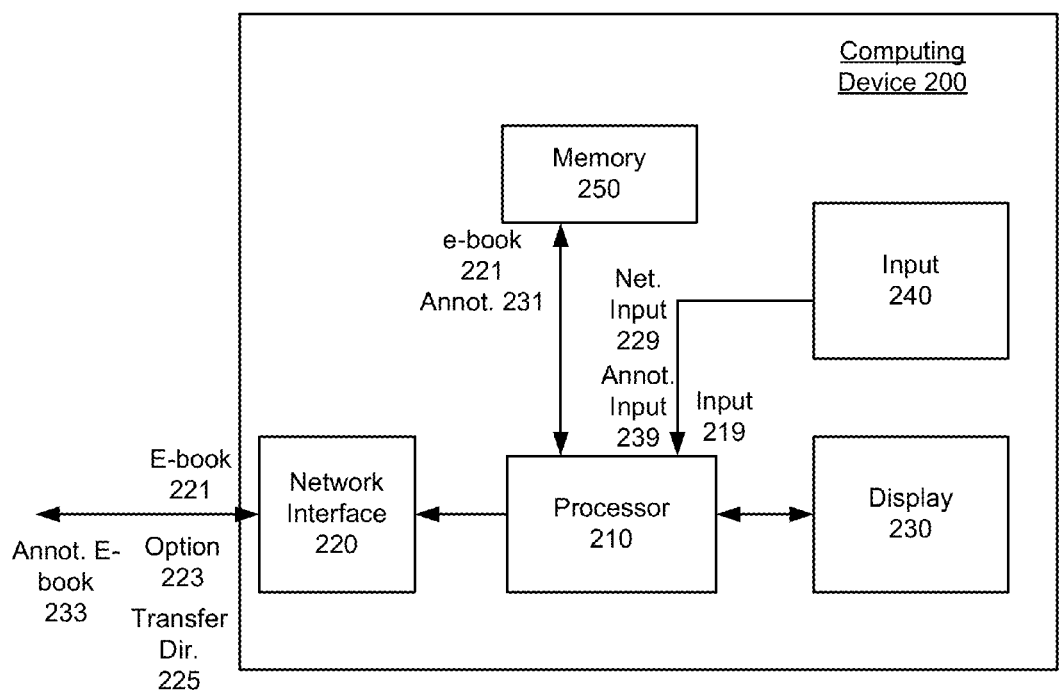
FIG. 2 illustrates an example of a mobile computing device in accordance with examples described herein.

FIG. 2 illustrates an example of a mobile computing device in accordance with examples described herein. The mobile computing device 200 can include a processor 210, a network interface 220, a display 230, one or more input mechanisms 240, and a memory 250. The processor 210 can utilize the network interface 220 to communicate with a network service 120 (see FIG. 1). Accordingly, the computing device 200 provides an example of mobile computing device 110 (as shown with FIG. 1), for use with network service 120. In communicating with the network service 120, the mobile computing device 200 can receive e-books 221 that the user has purchased or otherwise selected to download from the network service. The e-books 221 that are downloaded onto the mobile computing device 200 may be stored in the memory 250. The processor 210 may perform read operations on the memory 250 in order to retrieve stored e-books to 21, for rendering on the display 230.

The display 230 can correspond to, for example, a liquid crystal display (LCD) that illuminates in order to provide content generated from processor 210. In alternative variations, for example, the display 230 can correspond to an electronic paper type display, which can be designed to mimic conventional paper in the manner in which they display content. Examples of such display technologies include electrophoretic displays, electrowetting displays, and electrofluidic displays. Examples described herein further appreciate that the media in which electronic type displays are provided can vary, and include, for example, plastic or paper combined with transistor elements or other circuitry.

Additionally, the user may operate the input mechanism 240 of the mobile computing device 200 to enter input, including e-book input 219, network service input 229, and annotation input 239. The e-book input 219 can include input for enabling the user to operate the e-reader 112 (see FIG. 1). Such input can include page transition input, chapter transition input, library selection etc. The network service 229 can include purchasing activities. Such activities can include purchasing e-books 221, re-selling (or offering for resale) purchased e-books, and acquiring options to re-sell purchased e-books. In one implementation, an application on the mobile computing device enables the user to access an online bookstore. The user may have an account established with the online bookstore. The user may operate the device 200 to view and/or purchased e-books for consumption on the device 200 (as well as other devices that may be linked to the same account). For example, the user may be able to purchase an e-book by operating an application on the computing device 200. In response to purchasing an e-book, the e-book 221 may automatically be downloaded to the device 200.

The input mechanism 240 can be used to enter annotation input 239 for a particular e-book 221 when the processor operates the annotation interface in an active or operational mode. The annotation input 239 can include a content aspect and a location where the content aspect is to be located in the e-book. The annotation input 239 can be linked to the e-book 221 in memory 250 as annotations 231, so as to create an annotated version of the e-book. Further, in some implementations, the annotated version of the e-book 221 can be communicated to the network service 120 and/or to another device via the network interface 220.

The computing device 200 can receive transfer directives or other instructions from the network service 120 in connection with an e-book being transferred. The transfer directives 225 can cause, for example, any one or more of the following: (i) delete the local copy of a specified e-book that was transferred, (ii) lock contents (e.g., preclude viewing of some or all pages of an e-book) of an e-book that was transferred, or (iii) lock/delete contents (e.g., all pages) or portions thereof of the transferred e-book.

Figure 3:
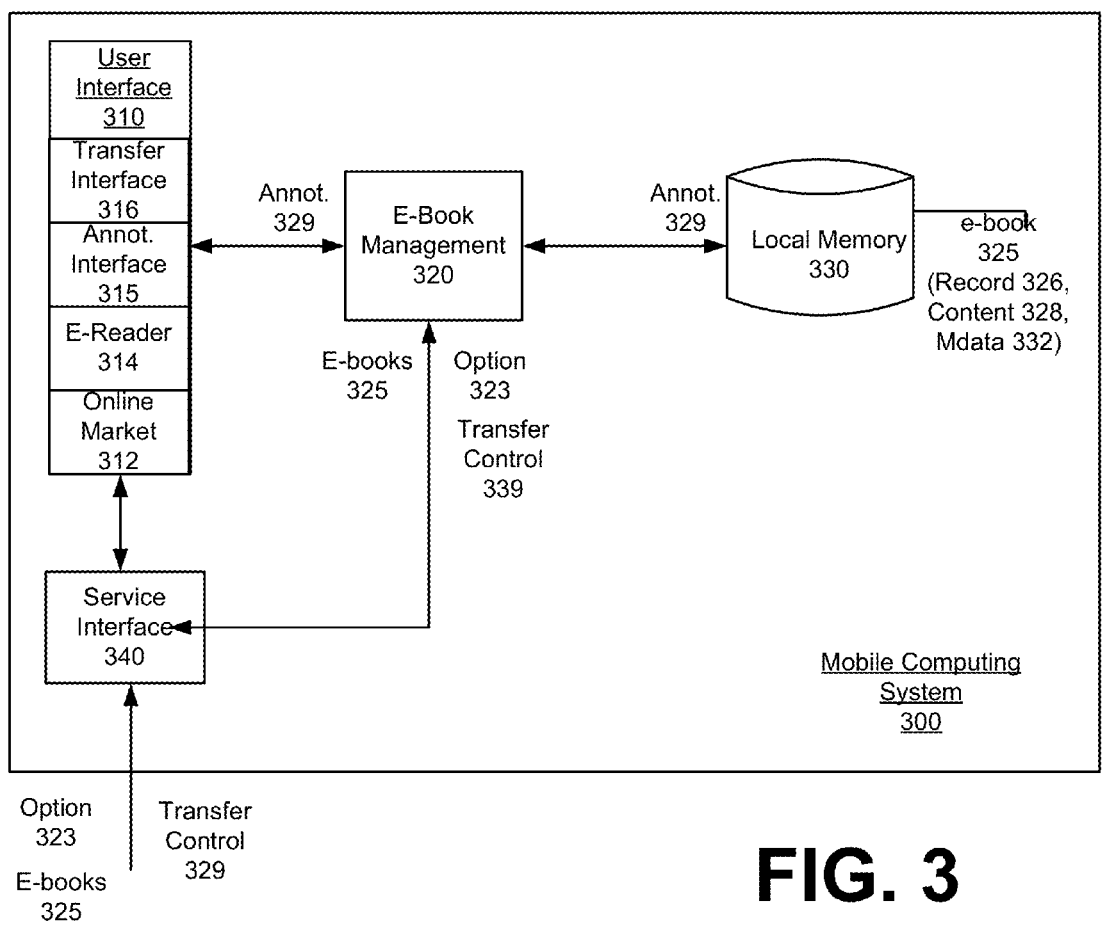
FIG. 3 illustrates a device system for enabling option-based resale of e-books, according to one or more embodiments.

FIG. 3 illustrates a device system for enabling annotations and transfers of e-books, according to one or more embodiments. In reference to FIG. 3, a mobile computing system 300 can implement programmatic components for implementing annotations, e-book activities, and purchasing activities. The mobile computing system 300 can implement some or all of its purchasing activities through communications with an e-book service (such as network service 120, shown in FIG. 1). In some implementations, the mobile computing system 300 can be implemented as an application that runs on a mobile computing device (e.g., such as shown by FIG. 1 or FIG. 2). In a variation, some or all of the functionality described with the mobile computing system 300 can be implemented on or through a network service 120.

In an example of FIG. 3, the mobile computing system 300 includes a user interface 310, an e-book management module 320, a local memory 330, and a service interface 340. The programmatic components shown with the computing system 300 can be provided as part of an application that runs on the computing system 300. For example, the user can download an application onto mobile computing device, to obtain functionality such as described herein, as well as to communicate with a network service 120. Alternatively, the application can be embedded or otherwise preinstalled with other programmatic elements for providing such functionality on a computing device.

The service interface 340 includes application and logic which enables the device to use, for example, a wireless Internet connection, to connect to the network service 120 (see FIG. 1). In connecting with the service, the service interface 340 can transmit data that enables the network service 120 to identify mobile computing system 300 (or alternatively the user) so that the network service 120 can determine the account associated with the mobile computing device. The service interface 340 can be used to retrieve e-books 325 from the network service 120. For example, in identifying the mobile computing system 300 to the network service 120, the network service procures payment information (e.g., stored credit card) that can be used to charge users account when purchasing a new e-book. Each e-book 325 can correspond to a literary work, having pagination and chapter designations.

The mobile computing system 300 stores acquired e-books 325 in the local memory 330. The e-books 325 can be stored as part of records 326, which specify metadata 328 and content 332. The content 332 can include pages of the e-book, as well as graphics that are provided for content. The metadata 328 can include information that identifies the e-book, including jacket art (e.g., graphics), information about the author, title, summary, user reviews, etc.

In identifying the mobile computing system 300, the network service 120 can identify what e-books belong to the account of that device. E-books 325 that are transmitted to the mobile computing system 300 include those that are purchased from the device, or those that the user requested to download. In variations, e-books 325 can automatically be downloaded to the device in response to the occurrence of certain conditions. For example, the user can purchase an e-book on another device, and then subsequently connect to the network service 120 via the mobile computing system 300 to automatically receive their previously purchased e-book. Alternatively, network service 120 can be configured to push e-books to the mobile computing system 300, based on, for example, user account settings, subscription rules, and various other business logic considerations. The e-book manager 320 can manage the storage of downloaded e-books in the local memory of the mobile computing system 300 for subsequent use.

Among other functionality, the user interface 310 can include a local online market interface 312 to enable the user to readily access an online store for e-books. The online market interface 312 can enable the user to purchase e-books, and to effect downloads of purchased e-books to the user device. Additionally, the online market interface 312 can enable the user to purchase or otherwise acquire an option 323 for subsequent resale of a purchased e-book. The option 323 can be communicated as a data item from the network service 120 to the mobile computing system 300.

The user-interface 310 can also include, for example, an e-reader 314 which includes functionality for displaying content of an e-book (e.g., pages), as well as to enabling interaction such as page or chapter turns.

In one implementation, the user can create the annotations 329 through use of the annotation interface 315. For example, the annotation interface 315 can receive input from the user in order to create annotations 329. In a variation, the annotations can be provided through a separate input mechanism that communicates with the mobile computing system 300. In some examples, the user can create annotations 329, which can be stored locally and/or communicated to the network service 120. The annotations 329 can include markings, messages (e.g., typed, or digitally inked), highlights, or other user-generated content. Optionally, each annotation 329 can include metadata that references the annotation 329 to an internal location with the e-book, such as to a specific page or point of reference within the e-book. The annotations 329 can be stored with the local memory 330 as part of, for example, metadata 332 associated with the particular e-book. As an addition or alternative, the annotations 329 can be communicated to the network service 120, where they are maintained in association with an online copy of the user's e-book.

In some embodiments, the user-interface 310 also includes a transfer interface 316. The transfer interface 316 enables the user to exercise an option 323 to re-sell a given purchased e-book 325. In one implementation, the transfer interface 316 enables the user to specify the e-book, and to communicate the intent for the user to re-sell the e-book. Optionally, the user may also operate the interface 316 to specify a price for the e-book, and a medium where the e-book is to be made available. The user can issue a transfer request 327 via the transfer interface 316, to request the network service 120 enable or otherwise provide for the transfer of the specified e-book.

The e-book management module 320 manages the storage of e-books 325 and options purchased with select e-books. When the user issues the transfer request 327, the user may specify the transferee. Depending on implementation, either the network service 120 or the mobile computing system 300 can signal that a transfer is in effect (e.g., transfer made). In response, the network service 120 can signal transfer control 339 to the e-book manager 320. The transfer control 339 can cause the e-book manager 320 to delete, disable or otherwise lock the e-book that was subject to the transfer. In a variation, the transfer control 339 can cause the e-book manager 320 to lock or delete the content portion (or portions thereof) of the e-book, so that, for example, the jacket or graphic art and other metadata associated with the e-book remains.

In an implementation in which the transferred e-book includes annotations 329, the annotations 329 can be communicated as part of the e-book that is being communicated. In this way, the user can communicate a personalized or annotated copy of a given e-book.

Methodology

Figure 4:
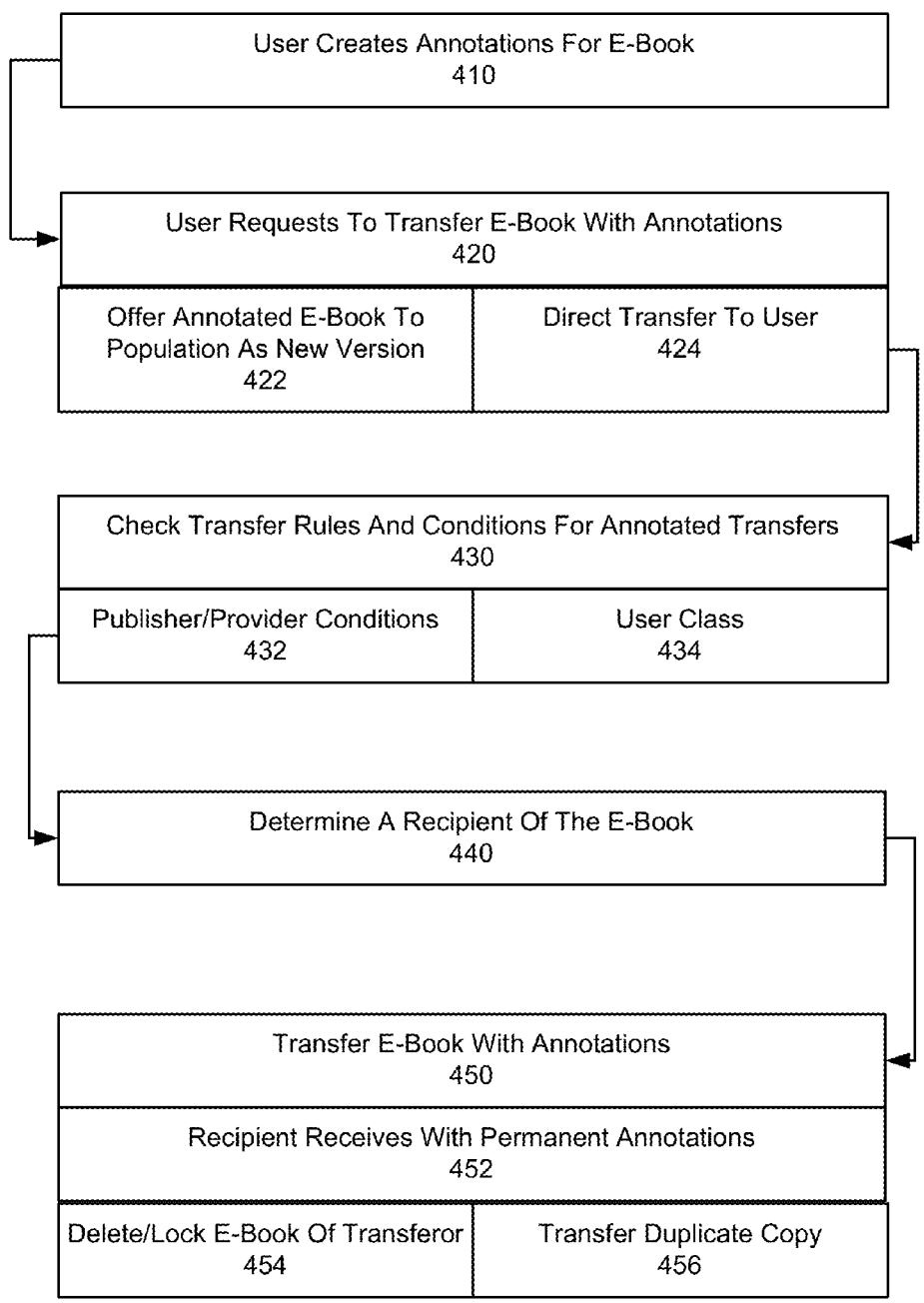
FIG. 4 illustrates a method for transferring an annotated version of an e-book, according to an embodiment.

FIG. 4 illustrates a method for transferring an annotated version of an e-book, according to an embodiment. An example such as described by FIG. 4 can be implemented using components such as described with FIG. 1, FIG. 2, or FIG. 3. Accordingly, reference may be made to elements of other figures for purpose of illustrating suitable elements or components for performing a step or sub-step being described.

With reference to FIG. 4, a user can create an annotated version of an e-book (410). To create an annotated version of an e-book, a user can operate, for example, the annotation interface 114 (which can be provided as a component of the e-reader application 112) on mobile computing device 110 to view the contents of the e-book and to provide annotations. Each annotation can include a content component and a location component. The content component can include text, ink, images or even audio, created by input from the user of the annotation interface 114. The location component of each annotation can identify a relative location of the content component in the e-book. The relative location can be identified by user input at the time the annotation is created or modified. For example, the user may select a location in an e-book where the annotation is to reside. This location can be marked spatially and/or by coordinates to be proximate to, for example, a word or phrase. The content component can also be positioned in a margin and/or whitespace of the e-book, at a given page or line number.

In some embodiments, the annotations can be made by any user who is in possession of an e-book. In variations, the annotations commune made by certain class of users, such as by authors or other individuals who have acquired the right to annotate an e-book.

A user can request to transfer an e-book with annotations (420). For example, the network service 120 may receive he request from the user to transfer a particular e-book with annotations. The request to transfer can correspond to different transaction types, such as (i) a permanent transfer of a user copy, (ii) a temporary transfer of a user copy, (iii) a re-publication, where the annotated e-book can be made available to multiple users (or a population thereof). The transfers can also correspond to a gift (so that consideration does not exchange hands), for exchange of funds (e.g., resale), or for exchange of other e-books and/or digital content items.

With reference to an example of FIG. 4, the requested transfer can be a republication (422) or a direct transfer (424). In a re-publication, the annotated version of the e-book is made available for download to multiple users, or to a population of users. For example, a user can annotate the e-book, and then uploaded the annotated e-book to network service 120, where the annotated e-book is made available for download as part of the e-book library 122. In one implementation, the annotated e-book can be made available for download to other users as a new version of an e-book. In a variation, the annotated e-book can replace an existing non-annotated version of the e-book in the e-book store 122. Still further, the annotated e-book can be made available to a population of users on a limited basis. For example, the annotated e-book can be provided as a single copy (e.g., first to download), or as a finite number of copies for download by a select set of users. In variations, annotated version of the e-book may correspond to a copy, so that the original user may retain his or her copy.

In the direct transfer, the user can transfer the annotated copy of the e-book to another user. For example, a user may annotate a textbook, and then transfer the annotated textbook to another user once the class is over. Once the annotated e-book is transferred, the e-book (either in annotated form or original form) may be locked or deleted on the transferor's device(s) or account.

In an embodiment, the network service 120 determines whether the requested transfer is permissible (430). In variations, either the e-reader of the transferor device, or the e-book being transferred, can implement data indicating whether the necessary permissions are present for enabling the transfer of an annotated version of an e-book. The determination as to whether a given transfer is permissible can be based on, for example, transfer rules maintained by a provider of the e-books (e.g., network service 120) (432). For example, in determining whether the e-book can be transferred, the network service 120, for example, can check publisher and/or third-party conditions that determine when annotated transfers can occur. In one implementation, the e-book store 122 can also link to a data store of publisher rules regarding the transfer of e-books, and more specifically, to the rights and abilities of users to make annotations and/or to transfer e-books with annotations. For example, a transfer rule from the publisher may provide that an author or publisher needs to designate that a transfer of an e-book can occur.

Still further, an e-book transfer may occur only if, for example, the user who annotated the e-book had not previously received the e-book as a transfer from another user. For example, the network service 120 may preclude a user from annotating an e-book that was previously annotated by another user. For example, the recipient in the transfer of an annotated e-book may be precluded from making additional annotations or re-transferring the annotated version of the e-book with additional annotations.

In another variation, publisher rules may permit multiple transfers of an annotated e-book, with each user being able to provide their own annotations. Thus, an annotated version of an e-book can be stored on a user device, where the e-book include a cumulative set of annotations from multiple users, along multiple transfers.

The determination as to whether a given transfer is permissible can also be based on the user that is making the transfer (434). In one embodiment, a user who is an author of an e-book can create annotations and other updates to that e-book. In authentication process can be implemented to ensure that the user creating the annotation is also the author. In a variation, a user of the particular user class can make annotations. The user class can correspond to, for example, a user who generally has the right to annotate e-books of, for example a certain type (e.g., a user who is an authority in a technical field relating to a textbook that has the annotations).

As still another example, in e-book may be annotated based on its edition. For example, in e-book may be sold or transferred in accordance with the addition that permits annotations.

In some embodiments, when a request for transfers made, a recipient of the transferred e-book is identified (440). For example, the recipient can correspond to another user of the network service 120. The recipient can be identified from the transferor who makes request (e.g., the transferor can specify the recipient at the time the request is made). Alternatively, the recipient can be identified from a directive (e.g., transferor publishes an offer for an annotated e-book and the offer is accepted through the network service 120).

In some variations, multiple copies of the e-books can be made available for users to download from the network service 120. Thus, more than one recipient can be identified, over a duration that includes publishing an offer for the annotated e-book.

The e-book can then be transferred to the recipient with the annotations (450). In one embodiment, the transfer occurs when the file(s) of the annotated e-book, including, for example, content files 332 and metadata files 328 (including annotations) that comprise the e-book, are copied from the user device onto the network service 120, and then onto (e.g., by download) to the device of the recipients. In a variation, the annotation files of the e-book can be transferred to the network service 120 and then combined with a network copy of the e-book (either on the network service 120 or on the recipient's devices). Thus, for example, the content aspects of the annotations in the transferor's copies can be transmitted to the network service 120 and/or recipient, and the location aspect of the annotations enables the annotations to be placed in the same place as the annotations accompanying the e-book of the transferor's device.

In one embodiment, the e-book that the recipient receives has the annotations permanently affixed (452). In this form, the user is not able to decouple the annotations from the e-book. In a variation, the recipient may be able to operate an e-reader application to hide the annotations, or to delete, replace or modify annotations.

In one embodiment, when the user transfers an annotated e-book, the user is unable to access the e-book again (unless the user re-acquires a right of possession to the e-book) (454). For example, the e-book may be locked or deleted on the device of the user. The user account 125 can also be updated to reflect that the particular user no longer has possession of the e-book.

As an alternative, the transfer from the user can reflect a copy (456). For example, the transferor user may be able to keep his or her own copy of the e-book. For example, the network service 120 can make multiple copies of the annotated e-book available for multiple users (or population of users).

In one variation, when the user transfers an annotated version of the e-book, he is able to keep a copy of the annotated e-book. In another variation, when the user transfers an annotated version of the e-book, he is able to keep a copy of the e-book without the annotations, so that the transfer is only for an annotated version of the e-book.

While an example of FIG. 4 provides for the network service to receive a request from a user to transfer an annotated version of an e-book, in variations the user can implement a direct transfer to another user without utilizing the network service 120. For example, a user can gift an annotated e-book to another user and direct transfer, using, for example, a peer-to-peer connection. Digital rights management can optionally be implemented by the e-reader applications of the respective user devices, and/or the e-books themselves.

User Interface

Figure 5:
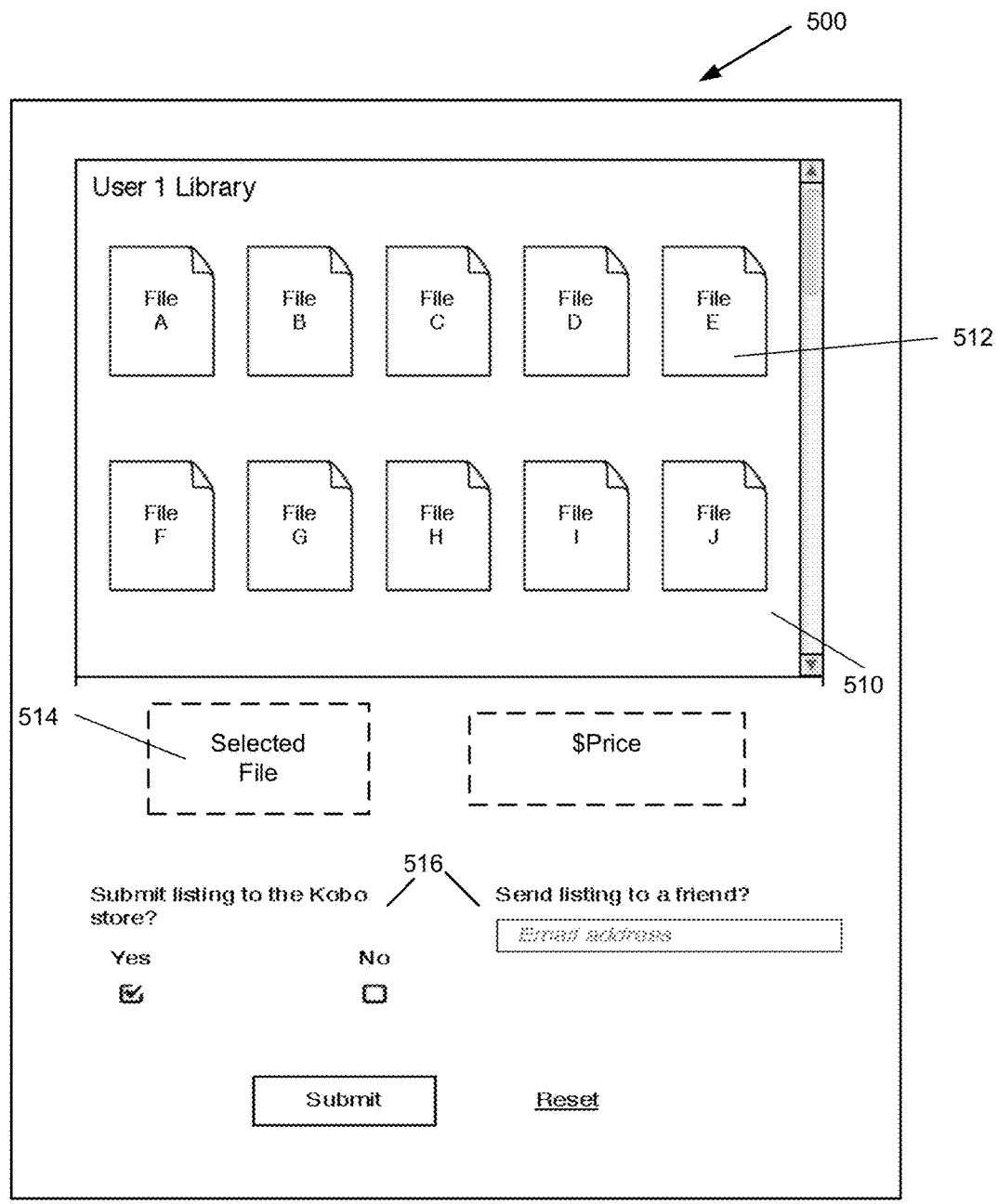
FIG. 5 illustrates an example interface for enabling a user to select e-books from a collection for transfer.

FIG. 5 illustrates an example interface for enabling a user to select e-books from a collection for transfer. The e-books selected for transfer can include versions of e-books that include annotations created by, for example, the user. An example interface such as shown with FIG. 5 can be provided by, for example, the user interface 310 of the mobile computing system 300 (see FIG. 3), or through the e-reader application 112 of the mobile computing device 110 (see FIG. 1).

In an embodiment, an interface 500 includes a library presentation 510 that shows individual e-books 512 of a user's digital content library. The interface 500 includes a selection feature 514 that enables the user to select an e-book from the collection for purpose of re-selling the e-book. In an example shown, the user is able to select a price for re-selling an e-book. In some implementations, restrictions may be programmatically implemented in order to preclude or influence the sale price of an e-book. For example, the network service 120 (or publisher) may charge the user for re-selling the e-book, in which case the user would have inherent motivation to keep the sale of the e-book above the minimum charge.

In one example, the user can enter input through the interface 500 to select, via the selection feature 514, a particular e-book for resale. In response to the user making the selection, a check may be automatically made in order to determine whether the user has acquired the option to re-sell the selected e-book. If the option exists, the user may be able to continue to re-sell the e-book. If the option does not exist, the selection feature 514 can indicate an error or impermissible action.

In some variations, the user can also elect a forum or medium where the resale of the e-book is to be provided. In one implementation, the user can utilize the interface 500 to generate a transaction record for the e-book. The transaction record can include, for example, the title of the e-book, the seller, the price, and other conditions or descriptions (e.g., including user-generated descriptions). The user can specify the forum 516 for where the transaction record is to be published.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for transferring an e-book, the method being implemented by one or more processors and comprising:
   detecting a request to transfer the e-book from a user;
   detecting a set of annotations that are associated with the e-book, wherein the set of annotations are created by the user on a device of the user;
   determining a recipient of the e-book;
   determining a set of rules associated with the recipient of the e-book, the set of rules including at least a first rule that permits the recipient of the e-book to annotate the e-book if the e-book has not been previously transferred between users, and a second rule that restricts the recipient of the e-book from annotating the e-book while permitting the recipient to transfer the e-book to another user if the e-book has been previously transferred between users; and
   providing the e-book to the recipient with the set of annotations being permanently affixed to the e-book.

2. The method of claim 1, wherein detecting the set of annotations includes determining an annotation component and a location within the e-book for each annotation in the set of annotations.

3. The method of claim 2, wherein providing the e-book to the recipient includes affixing the annotation component of each annotation in the set of annotations to a corresponding location in the e-book.

4. The method of claim 1, further comprising providing the e-book with the set of annotations for download to a population of users as an updated version of the e-book.

5. The method of claim 4, further comprising detecting that the user has a right to make the set of annotations that are affixed to the e-book and made available for the population.

6. The method of claim 5, wherein detecting that the user has the right to make the set of annotations includes authenticating the user.

7. The method of claim 5, wherein detecting that the user has the right to make the set of annotations includes determining that the user has acquired a right to make the annotations.

8. The method of claim 1, further comprising detecting that the e-book is associated with a set of rules that allow at least the user to make the set of annotations and to transfer the set of annotations.

9. The method of claim 8, wherein the set of rules includes a rule that prevents a user from annotating an e-book which has already been annotated.

10. A method for transferring an e-book, the method being implemented by one or more processors and comprising:
    detecting a request to transfer the e-book from a user;
    detecting a set of annotations that are associated with the e-book, wherein the set of annotations are created by the user on a device of the user;
    determining a set of rules associated with a recipient of the e-book, the set of rules including at least a first rule that permits the recipient of the e-book to annotate the e-book if the e-book has not been previously transferred between users, and a second rule that restricts the recipient of the e-book from annotating the e-book while permitting the recipient to transfer the e-book to another user if the e-book has been previously transferred between users; and
    providing the e-book with the set of annotations for download to a population of users including the recipient as an updated version of the e-book, the annotations being permanently affixed to the e-book.

11. The method of claim 10, wherein detecting the set of annotations includes determining an annotation component and a location within the e-book for each annotation in the set of annotations.

12. The method of claim 11, further comprising providing the e-book to a recipient by affixing the annotation component of each annotation in the set of annotations to a corresponding location in the e-book.

13. The method of claim 10, further comprising detecting that the user has a right to make the set of annotations that are affixed to the e-book and made available for the population.

14. The method of claim 13, wherein detecting that the user has the right to make the set of annotations includes authenticating the user.

15. The method of claim 13, wherein detecting that the user has the right to make the set of annotations includes detecting that the user is an author of the e-book.

16. The method of claim 10, further comprising detecting that the e-book is associated with a set of rules that allow at least the user to make the set of annotations and to transfer the set of annotations.

17. The method of claim 10, further comprising determining that the user has a right of possession to the e-book.

18. The method of claim 16, wherein the set of rules includes a rule that prevents a user from annotating an e-book which has already been annotated.

19. A non-transitory computer-readable medium that stores instructions for transferring an e-book, wherein the instructions, when executed by one or more processors, cause the one or more processors to perform operations that include:
    detecting a request to transfer the e-book from a user;
    detecting a set of annotations that are associated with the e-book, wherein the set of annotations are created by the user on a device of the user;
    determining a recipient of the e-book;
    determining a set of rules associated with the recipient of the e-book, the set of rules including at least a first rule that permits the recipient of the e-book to annotate the e-book if the e-book has not been previously transferred between users, and a second rule that restricts the recipient of the e-book from annotating the e-book while permitting the recipient to transfer the e-book to another user if the e-book has been previously transferred between users; and providing the e-book to the recipient with the set of annotations being permanently affixed to the e-book.

20. A non-transitory computer-readable medium that stores instructions for transferring an e-book, wherein the instructions, when executed by one or more processors, cause the one or more processors to perform operations that include:

detecting a request to transfer the e-book from a user;

detecting a set of annotations that are associated with the e-book, wherein the set of annotations are created by the user on a device of the user;

determining a set of rules associated with a recipient of the e-book, the set of rules including at least a first rule that permits the recipient of the e-book to annotate the e-book if the e-book has not been previously transferred between users, and a second rule that restricts the recipient of the e-book from annotating the e-book while permitting the recipient to transfer the e-book to another user if the e-book has been previously transferred between users; and providing the e-book with the set of annotations for download to a population of users including the recipient as an updated version of the e-book, the annotations being permanently affixed to the e-book.

21. The method of claim 1, further comprising providing one or more interface features to enable the user to create annotations associated with the e-book.

22. The method of claim 1, wherein the set of rules further includes a third rule permitting the recipient of the e-book to republish the e-book with the set of annotations if the recipient is associated with a first set of users authorized to republish the e-book.

23. The method of claim 1, wherein the set of rules further includes a third rule permitting only a first set of users to annotate the e-book, the first set of users including at least an author of the e-book, a publisher of the e-book, and a recipient of a first transfer of the e-book.

* * * * *